(12) United States Patent
Bryan

(10) Patent No.: US 7,181,852 B2
(45) Date of Patent: Feb. 27, 2007

(54) SENSING STEERING AXIS INCLINATION AND CAMBER WITH AN ACCELEROMETER

(75) Inventor: Eric F. Bryan, Conway, AR (US)

(73) Assignee: Snap-On Incorporated, Kenosha, WI (US)

( * ) Notice: Subject to any disclaimer, the term of this patent is extended or adjusted under 35 U.S.C. 154(b) by 0 days.

(21) Appl. No.: 11/509,762

(22) Filed: Aug. 25, 2006

(65) Prior Publication Data

US 2006/0283027 A1 Dec. 21, 2006

Related U.S. Application Data

(62) Division of application No. 10/815,858, filed on Apr. 2, 2004.

(60) Provisional application No. 60/459,998, filed on Apr. 4, 2003.

(51) Int. Cl.
*G01B 5/24* (2006.01)

(52) U.S. Cl. .................. 33/203.18; 33/203; 33/288

(58) Field of Classification Search .......... 33/203.18, 33/203.19, 203.2, 613, 645, 288
See application file for complete search history.

(56) References Cited

U.S. PATENT DOCUMENTS

| | | | |
|---|---|---|---|
| 3,892,042 A | 7/1975 | Senften | |
| 4,138,825 A | 2/1979 | Pelta | |
| 4,274,738 A | 6/1981 | Hollandsworth et al. | |
| 5,191,713 A | 3/1993 | Alger et al. | |
| 5,531,030 A | 7/1996 | Dale, Jr. | |
| 5,937,365 A * | 8/1999 | Friton et al. | 702/106 |
| 6,014,814 A | 1/2000 | Imbert et al. | |
| 6,171,880 B1 | 1/2001 | Gaitan et al. | |
| 6,311,555 B1 | 11/2001 | McCall et al. | |
| 6,741,169 B2 | 5/2004 | Magiawala et al. | |
| 6,792,792 B2 | 9/2004 | Babala | |
| 6,929,086 B1 * | 8/2005 | Husain et al. | 701/43 |
| 2004/0164140 A1 * | 8/2004 | Voeller et al. | 235/375 |
| 2005/0073435 A1 * | 4/2005 | Voeller et al. | 340/933 |
| 2005/0126021 A1 * | 6/2005 | Robb et al. | 33/288 |
| 2006/0085108 A1 * | 4/2006 | Grier et al. | 701/29 |

FOREIGN PATENT DOCUMENTS

EP  1 226 986 A1  7/2002
WO  WO 98/25106  6/1998

OTHER PUBLICATIONS

Memsic, "Inclination Sensing with Thermal Accelermoteters", #AN-00MX-007 Application Note Rev A May 2002, pp. 1-3.

(Continued)

*Primary Examiner*—Yaritza Guadalupe-McCall
(74) *Attorney, Agent, or Firm*—McDermott Will & Emery LLP

(57) ABSTRACT

Methods and devices for measuring and calculating wheel alignment angles. Light weight and mechanically robust accelerometers in measurement heads are attached to a vehicle's wheels during an alignment procedure. The output of the accelerometers may be compensated for effects of temperature or thermal hysteresis by memory lookup or a temperature based feedback control loop.

12 Claims, 5 Drawing Sheets

OTHER PUBLICATIONS

Memsic, "Accelerometer Fundamentals", #AN-00MX-001 Application Note, pp. 1-7.

Memsic, "Thermal Accelerometers Temperature Compensation", #AN-00MX-002 Application Note, pp. 1-6.

Mllanovi et al., "Convection-based Accelerometer and Tilt Sensor Implemented in Standard CMOS", Intl. Mechanical Eng. Conf. and Expo., MEMS Symposia, Anaheim, CA, Nov. 18, 1998 (4 pages).

Bugnacki et al., "A Micromachined Thermal Accelerometer for Motion, Inclination, and Vibration Measurement", Sensors—Jun. 2001, (11 Pages).

Bugnacki et al., "Innovation in MEMS: Full Integration of Micromachined Motion sensors with no Moving Pads", Dedicated Systems Magazine, 2001 Q4 pp. 6-12 (7 pages).

Hodon et al., "A Dual-Mis Tilt Sensor Based on Micromachined Accelerometers", Sensors—Apr. 1996, pp. 91-94 (4 pages.

Analog Devices Press Release MMulti-purpose Accelerometer Measures Low g Forces with 0.005g Resoultion 1ADXLOSID, Norwood, MA, May 1, 1995, 2 pages.

Crossbow Technology, Inc.: San Jose, CA—Domestic Price List and Product Literature for "CXTILT02Dual Axis Digital Tilt Sesor" and UCXLO4M3 Triaxial Accelerometer dated May 6, 1996 (8 pages).

Affidavit of Mr. John Crawford of Crossbow Technolgy, Inc. attesting to associated correspondence between Mr. Nick Colarelli of Hunter Engineering Co. and Mr. John Crawford dated Aug 1996 regarding the use of Crossbow Technolgy, Inc.'s MEMS dual-Axis.

* cited by examiner

SENSING STEERING AXIS INCLINATION AND CAMBER WITH AN ACCELEROMETER

RELATED APPLICATION

This application is a divisional application of Ser. No. 10/815,858, filed Apr. 2, 2004, which claims the benefit under 35 U.S.C. § 119(e) of U.S. Provisional application Ser. No. 60/459,998, filed Apr. 4, 2003, the contents of which are herewith incorporated by reference.

TECHNICAL FIELD

The disclosures herein relate to wheel alignment systems, and to methods and devices for measuring various relevant parameters. More specifically, the disclosures relate to use of lightweight, mechanically robust inclination sensors in wheel alignment systems.

BACKGROUND

Wheel alignment is a process of adjusting the angles of wheels on a vehicle so that they are generally perpendicular to the ground and parallel to one another. The purpose of such adjustments is to attain maximum tire life, as well as to ensure that the vehicle tracks straight when driving along a straight and level road.

In order to adjust the wheel angles to achieve proper wheel alignment, the actual wheel angles must first be measured, such that the requisite adjustments may then be calculated. Two particular angles that are utilized in wheel alignment methods are commonly referred to as "camber" and "toe." Camber, which is typically measured in degrees, is the angle of the wheel's deviation from a vertical plane. Therefore, camber is angle of the wheel that is seen when viewed from the front of the vehicle. If the top of the wheel is leaning out from the center of the car, the camber is positive; if it is leaning in toward to center of the car, then the camber is negative. Toe is the difference in distance between the front of two tires and the back of those tires. It is normally measured in fractions of an inch, and is usually set close to zero, meaning that the wheels are substantially parallel to one another. "Toe-in" means that the fronts of the tires are closer to each other than the rears; "toe-out" is the opposite situation.

Some types of wheel alignment procedures involve placing optical instrumentation on each of a vehicle's four wheels. The instrumentation may be assembled together in a "head" that is clamped to each of the wheels. A head may include a transmitting device such as an LED emitter, and a receiving device such as a photosensor. During an alignment procedure, the receiving device of each head "looks" at the transmitted light from two heads of the two adjacent wheels. The optical "box" that is formed around the four wheels by the transmitting devices may thus be sensed by the four receiving devices as the wheels are rotated, and the various angle wheels may thereby be calculated. However, such procedures involve certain inherent measurement inaccuracies and can therefore result in alignment errors. For example, if a head is clamped to a wheel incorrectly, inaccurate measurements may result.

Other alignment systems have utilized non-optical sensors for measuring alignment angles, such as magneto resistive sensors on pendulums, electrolytic vials and other pendulum type devices. These types of sensors may not be as susceptible to wobble and other errors that optical sensors may encounter. However, magneto resistive and pendulum based elements are susceptible to breakage and accuracy problems caused by mechanical shock. An additional drawback is that these types of sensors can often be bulky and difficult to handle, and are relatively expensive.

What is needed is a wheel alignment method that utilizes a lighter, less expensive sensor on the measurement heads. What is further needed is a wheel alignment system whose measurement heads have improved robustness capable of withstanding increased mechanical shock without breaking or deviating in measurement accuracy.

SUMMARY

The methods and devices disclosed herein help solve these and other problems by providing a wheel alignment system and method that utilize tilt sensors that are mechanically robust and easier to use. The thermal based sensors utilized by the methods and devices disclosed herein are less expensive than conventional tilt sensors, and are lighter, such that they are easier to handle.

In one aspect, a method for measuring a wheel alignment angle includes attaching to a wheel a measurement head including an accelerometer, and measuring, with the accelerometer, a wheel angle with respect to gravity.

In another aspect, a method for measuring a wheel alignment angle includes attaching to a wheel a measurement head including an accelerometer, operatively connecting a thermal sensor to the accelerometer, measuring, with the accelerometer, an uncompensated wheel angle, and measuring, with the thermal sensor, a temperature to which the accelerometer is subjected. The method also includes calculating a compensated wheel angle as a function of the uncompensated wheel angle and the measured temperature.

In a further aspect, a measurement head for a wheel alignment system includes an accelerometer configured to measure an uncompensated wheel angle with respect to gravity, a thermal sensor configured to measure a temperature to which the accelerometer is subjected, and a compensator operatively coupled to the accelerometer and the thermal sensor and configured to calculate a compensated wheel angle as a function of the uncompensated wheel angle and the measured temperature.

In another aspect, a wheel alignment system includes a measurement head including an accelerometer configured to calculate a wheel angle with respect to gravity, and a computing device operatively coupled to the measurement head and configured to receive the wheel angle and to compute a wheel alignment parameter based on the wheel angle.

Additional aspects and advantages of the present disclosure will become readily apparent to those skilled in this art from the following detailed description, wherein only exemplary embodiments are shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF THE DRAWINGS

The accompanying drawings illustrate several embodiments and, together with the description, serve to explain the principles of the present disclosure.

DETAILED DESCRIPTION OF THE EMBODIMENTS

The present disclosure is now described more fully with reference to the accompanying figures, in which several embodiments are shown. One skilled in the art will recognize that methods, apparatus, systems, data structures, and computer readable media implement the features, functionalities, or modes of usage described herein. For instance, an apparatus embodiment can perform the corresponding steps or acts of a method embodiment.

Figure 1:
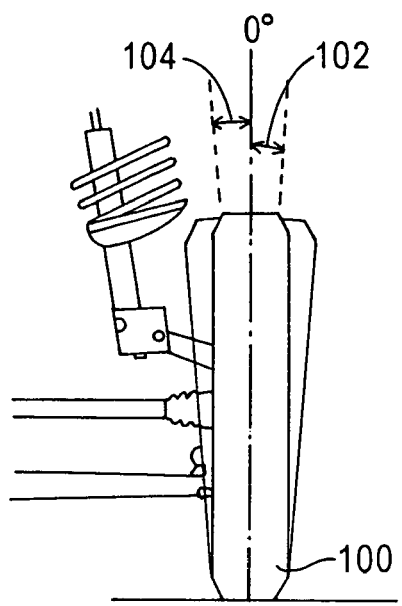
FIG. 1 illustrates camber as measured by an exemplary wheel alignment system.

FIG. 1 illustrates camber as measured by an exemplary wheel alignment system. Camber is the angle of the wheel 100, generally measured in degrees, when viewed from the front of the vehicle. If the top of wheel 100 is leaning out from the center of the vehicle, then the camber is positive as indicated at angle 102. If the top of wheel 100 is leaning in toward the center of the vehicle, then the camber is negative as indicated at angle 104.

Figure 2:
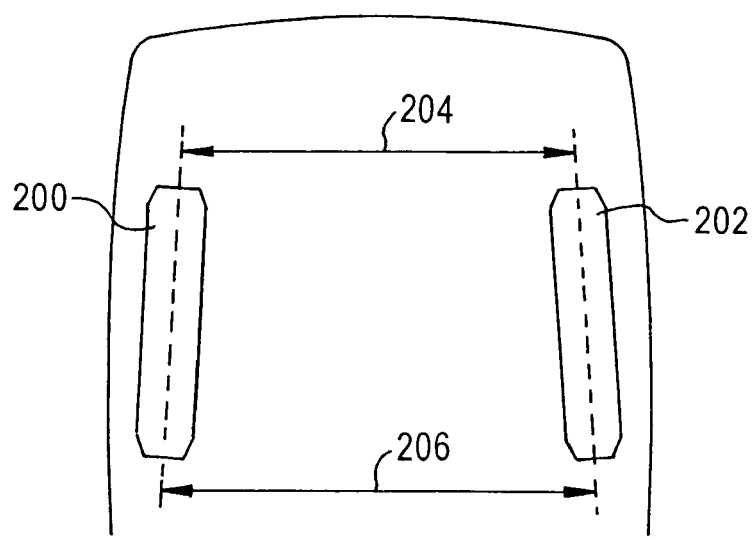
FIG. 2 illustrates toe as measured by an exemplary wheel alignment system.

FIG. 2 illustrates toe as measured by an exemplary wheel alignment system. The toe of two adjacent tires 200 and 202 is the difference in distance 204 between the fronts of tires 200 and 202 and distance 206 between the rears of tires 200 and 202. Toe is typically measured in fractions of an inch, and a measurement of zero inches would indicate that tires 200 and 202 are substantially parallel with one another.

Figure 3:
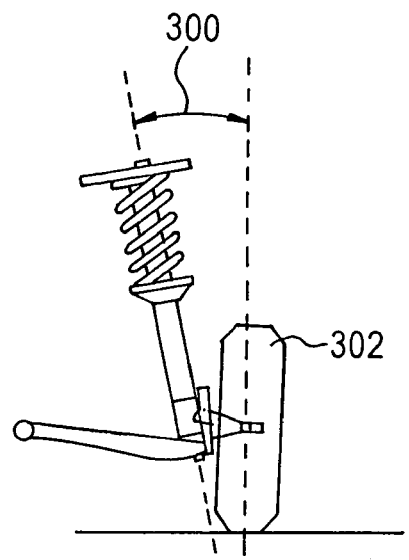
FIG. 3 illustrates steering axis inclination as measured by an exemplary wheel alignment system.

FIG. 3 illustrates steering axis inclination (SAI) as measured by an exemplary wheel alignment system. The SAI angle 300 is typically in degrees, and represents the steering pivot line when viewed from the front of a vehicle. When added to camber, SAI causes the vehicle to lift slightly when its wheel 302 is turned away from a straight ahead position.

Figure 4:
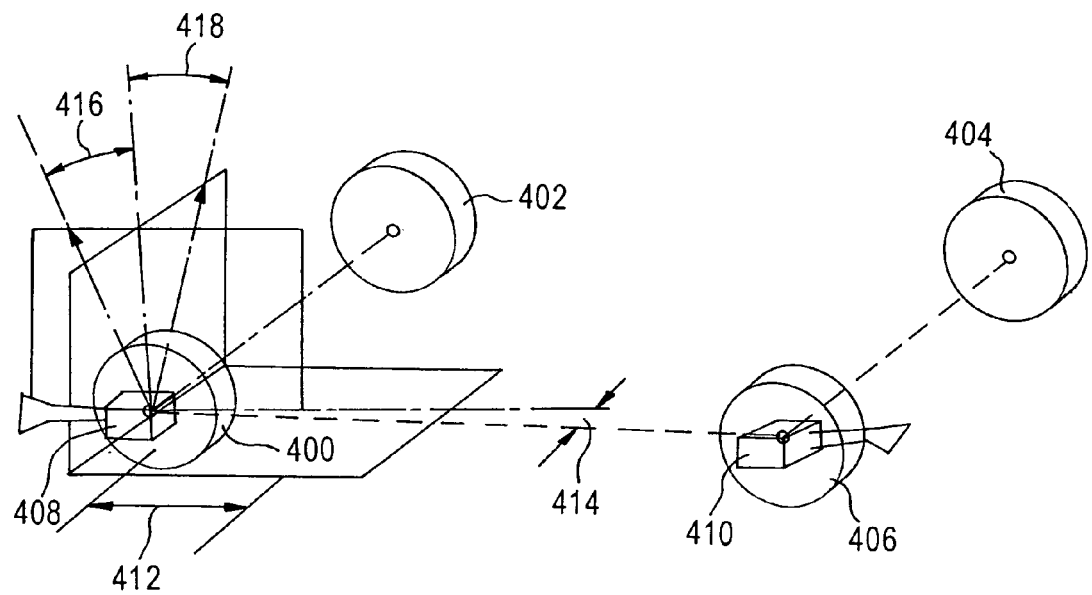
FIG. 4 illustrates an exemplary wheel alignment setup and various angles of measurement.

FIG. 4 illustrates an exemplary wheel alignment setup and various angles of measurement. In the exemplary setup, a vehicle has four wheels 400, 402, 404, 406 arranged for alignment testing. Measurement heads 408, 410 may be attached to each wheel. For example, measurement head 408 is attached to wheel 400, and measurement head 410 is attached to wheel 406. Wheels 402 and 404 may also have measurement heads attached to them (not illustrated).

Wheels 400 through 406 may be rotated through a distance 412 while measurement heads 408, 410 make gravity-dependent measurements, as described in further detail below, of various alignment angles. For example, angles measured by measurement head 408 may include toe 414, SAI 416 and camber 418. Toe 414 is measured relative to a measurement head attached to wheel 402, while SAI 416 and camber 418 are measured relative to gravity.

In one embodiment, the measurement heads 408, 410 are convection- or thermal-based accelerometers. One suitable thermal accelerometer is a micro-electromechanical systems (MEMS) accelerometer, which is commercially available from MEMSIC, Inc. of North Andover, Mass.

As one skilled in the art will appreciate, embodiments of the present disclosure may include various MEMS accelerometers, such as conventional solid proof mass accelerometers. Various conventional micro-machined or MEMS devices can be used to measure wheel alignment parameters or positions (e.g., toe, camber and SAI).

Figure 5:
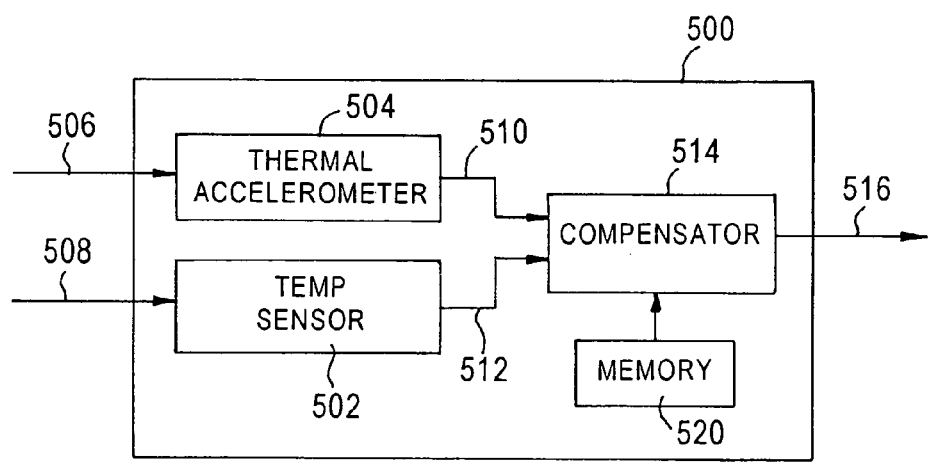
FIG. 5 illustrates an exemplary thermal based measurement head for use in a wheel alignment system.

FIG. 5 illustrates an exemplary thermal based measurement head for use in a wheel alignment system. Measurement head 500 comprises a thermal sensor 502 and a thermal accelerometer 504, such as a commercially available thermal accelerometer as described above. Of course, in another embodiment, the measurement head 500 may include another type of MEMS accelerometer (e.g., solid proof mass) and corresponding logic functions.

Thermal accelerometer 504 may include dual axis, linear motion sensors with integrated mixed signal processing. The thermal accelerometer 504 can measure varying and constant accelerations. A special case of constant acceleration is the force of gravity. When the thermal accelerometer 504 is stationary (i.e., no lateral or vertical accelerations are present) the only force acting on the accelerometer is gravity. The angle between the (vertical) gravitational force, and an accelerometer sensing axis is the inclination angle.

In one embodiment, to measure inclination from a horizontal orientation of the thermal accelerometer 504, a calculation is performed because the thermal accelerometer output (i.e., measured inclination 510) represents the acceleration of gravity acting on the sensing axis, as described in MEMSIC Application Note #AN-00MX-007, entitled "Inclination Sensing with Thermal Accelerometers," dated Mar. 21, 2002, which is incorporated herein by reference. The relationship between accelerometer outputs (x-axis and y-axis) and gravity is expressed by Equations 1 and 2, where Ax and Ay represent accelerometer outputs, g is the acceleration due to gravity, and $\alpha$, $\beta$ are the inclination angles.

$$Ax = g \cdot \sin(\alpha) \tag{1}$$

$$Ay = g \cdot \sin(\beta) \tag{2}$$

The inclination angle may be calculated from the inverse of the sine function as expressed by Equations 3 and 4.

$$\alpha = \sin^{-1}(Ax/g) \tag{3}$$

$$\beta = \sin^{-1}(Ax/g) \tag{4}$$

In another embodiment, the thermal accelerometer 504 may be positioned in a vertical orientation. When inclination measurement is needed for angles greater than 90° arc, the accelerometer outputs (x-axis and y-axis) can be combined to obtain good resolution for angles through a 360° arc range. With this approach, one dual axis accelerometer is configured to measure a single axis of inclination.

The relationship between acceleration and inclination angles in this configuration is defined by Equations 5 and 6. In this configuration $(\delta+\gamma)=90°$ arc, so it suffices to know either one of $\delta$ or $\gamma$.

$$Ax = g \cdot \sin(\delta) \tag{5}$$

$$Ay = g \cdot \sin(\gamma) \tag{6}$$

The Ax relationship in Equation 5 can be rewritten as Equation 7. Dividing Equations 5 and 6 yields Equation 8.

$$Ax = g \cdot \sin(-\gamma + 90° \text{ arc}) = g \cdot \cos(\gamma) \tag{7}$$

$$[Ay/Ax] = [(g \cdot \sin(\gamma))/(g \cdot \cos(\gamma))] = \tan(\gamma) \tag{8}$$

Therefore the inclination angle γ can be calculated by applying the inverse of the tangent function as shown in Equation 9.

$$\gamma = \tan^{-1}[Ay/Ax] \quad (9)$$

As one skilled in the art will appreciate, one advantage of the vertical orientation is that errors that are common to both outputs are removed in the signal process of dividing Ay by Ax. Further details of thermal accelerometers may be found in the MEMSIC Application Note #AN-00MX-007, which is also referenced above.

Referring again to FIG. 5, an inclination input 506 is received by thermal accelerometer 504, and a temperature input 508 is received by thermal sensor 502. The measured inclination 510 is output from thermal accelerometer, and the measured temperature 512 is output from thermal sensor 512, and both signals are input to compensator 514. As one skilled in the art will appreciate, the sensitivity and zero gravity (g) bias change when the thermal accelerometer 504 is exposed to different ambient temperatures. Although the thermal accelerometer 504 and the temperature sensor 502 are distinctly illustrated, the thermal accelerometer 504 may incorporate a temperature sensor or other functionality with the same physical package. Compensator 514 adjusts the output of thermal accelerometer 504 to compensate for temperature effect induced by measured temperature 512.

The sensitivity typically decreases with increasing temperature, and the zero g bias may increase or decrease with increasing temperature. Various techniques may be used to compensate for temperature changes. For example, MEMSIC Application Note #AN-00MX-002, entitled "Thermal Accelerometers Temperature Compensation," dated Apr. 11, 2002, which is incorporated by reference herein, describes some temperature compensation techniques.

The temperature effect on the sensitivity of the thermal accelerometer 504 can be characterized by Equation 10, where $S_i$ is the sensitivity at any initial temperature $T_i$, and $S_f$ is the sensitivity at any other final temperature $T_f$, with the temperatures in degrees Kelvin (K). The exponential of the temperature term T is typically provided by the manufacturer because the exponential may vary depending on the structure of the thermal accelerometer 504.

$$S_i \cdot S_i^{2.67} = S_f \cdot T_f^{2.67} \quad (10)$$

In one embodiment, measured temperature 512 may be received as an input by thermal accelerometer 504 which may use it directly in a feedback control loop to compensate for temperature effect. For example, the thermal sensor 502 (e.g., a conventional thermistor) can be used in the input network of an operational amplifier circuit. The resulting feedback gain circuit includes a resistor network to approximate the inverse of the behavior of the accelerometer sensitivity. Additional details on the feedback gain circuit are described below and with reference to FIG. 6. The output 516 of thermal based measurement head 500 is a compensated inclination, adjusted for effects of temperature measured by thermal sensor 502.

For use in thermal based measurement head 500, thermal accelerometer 504 may be calibrated for zero gravity (g) offset. The amount that the zero g bias changes with temperature can be characterized by Equation 11, where Z is the zero g bias at any temperature T and a, b, c are constants characteristic to the thermal accelerometer 504.

$$Z = a + b \cdot T + c \cdot T^2 \quad (11)$$

In one embodiment, the zero g bias compensation may be achieved by measuring a change in calculated angle for various temperatures while maintaining thermal accelerometer 504 in a level position. For example, thermal accelerometer 504 may be driven through three temperatures while held in a level position.

The zero offsets for each axis are measured for a plurality of temperatures and stored in a memory component 520 of compensator 514, such as in a data table or as a calculable function. The compensator 514 may also include signal processing capabilities, such as an analog-to-digital converter, an digital-to-analog converter, and a microcontroller (or other processor). Compensator 514 may then access memory component 520 to retrieve these data, and subsequently use them to compensate for changes in measurement sensitivity of thermal accelerometer 504 that occur due to changes in temperature measured by thermal sensor 502. For example, compensator 514 may compare measured temperature 512 to an adjustment factor, such as adjustment data or an adjustment function, stored in memory component 520. The adjustment factor is retrieved and applied by compensator 514 to measured inclination 510 to generate compensated inclination 516. In one embodiment, a conventional linear approximation can be used to calculate the offset correction from the zero offsets. As one skilled in the art will appreciate, other curve fitting techniques, such as splines may also be used.

Similarly, compensator 514 may be configured to enhance the accuracy of the thermal accelerometer 504. Several accelerometer measurements may be taken for each of a plurality of angles as described above with respect to the level position. These data may be stored in memory component 520 and retrieved by compensator 514 according to measured temperature 512 to compensate for measured inclination 510.

Further, in an embodiment, the compensator 514 may use the calculated offset correction to set a voltage in a digital-to-analog converter (DAC) that is electrically added/subtracted from the output of the thermal accelerometer 504. Although one skilled in the art will appreciate that the setting of the voltage may be accomplished in software, one advantage of an analog circuit is that higher gains can be obtained in the analog chain for more accuracy with a given voltage swing from the thermal accelerometer 504. That is, the measurement range of the analog-to-digital converter (ADC) is not compromised in order to measure the zero offset of the thermal accelerometer 504. The acceleration signal full scale output (at room temperature) is set so as not to exceed the ADC full scale range.

In one embodiment, after calibration in a level position, the thermal accelerometer 504 is placed so that both the x and the y axis are at a known angle with respect to gravity. The angle can be selected to be at the middle of the measurement range, for example. The output (in each axis) of the thermal accelerometer 504 is compensated for temperature offset and recorded. This value yields the gain (in volts per G) of the thermal accelerometer 504, which is used as the basis for a calculation for the gain at various temperatures as defined in Equation 12. As one skilled in the art will recognize, Equation 12 is particularly applicable to the MEMS accelerometer described above (which is commercially available from MEMSIC, Inc. of North Andover, Mass.), and there may be different characteristics for other types of devices. Similar to the offset correction described above, the exponential function in Equation 12 may be approximated by conventional interpolation techniques (e.g., linear or quadratic). In another embodiment, Equation 12 may be implemented or evaluated with a programmable gain amplifier in a feedback control loop.

$$A_{out} \text{ compensate } d = A_{out}*(TOUT^{2.67}TOUT_{25° C}^{2.67}) \qquad (12)$$

Figure 6:
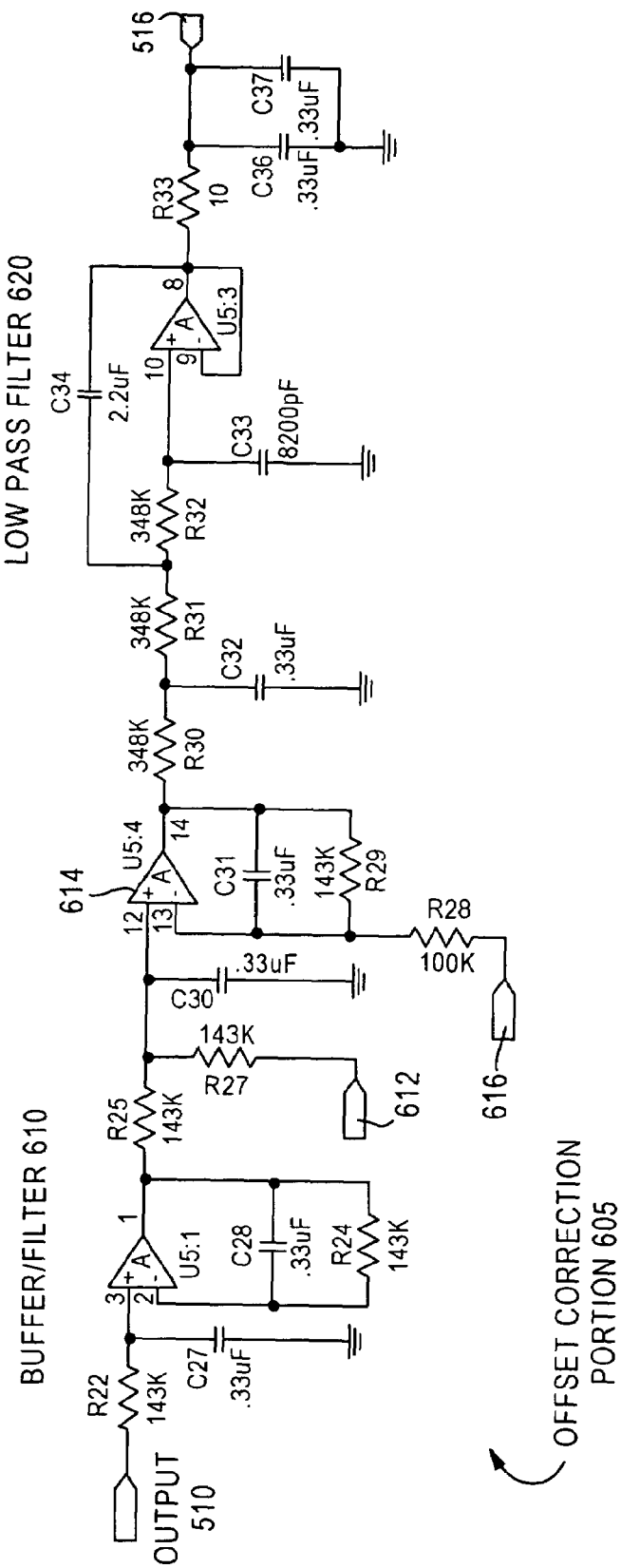
FIG. 6 is a schematic illustrating a compensator circuit.

FIG. 6 is a schematic illustrating a compensator circuit. In the illustrated embodiment, the compensator circuit generally includes an offset correction portion 605. By way of example, the offset correction portion 605 is illustrated for one axis of the thermal accelerometer output 510. Of course, in a dual or multiple axis environment, the same or similar offset correction portion 605 may be implemented for the other axes if desired. The thermal accelerometer output 510 is provided to a buffer/filter circuit 610. Resistors R25 and R27 then perform an offset correction on the buffered/filtered signal. A calculated offset correction 612 is electrically added or subtracted from the buffered/filtered signal. The calculated offset correction 612 is received from the microcontroller DAC.

An operational amplifier 614 is then used to shift the signal level to about halfway between the supply rails. A reference voltage 616 is selected to be between the supply rail voltages and is provided to the operational amplifier 614. A low pass filter 620 then filters the level adjusted signal and outputs an offset compensated inclination 516 to the microcontroller.

Figure 7:
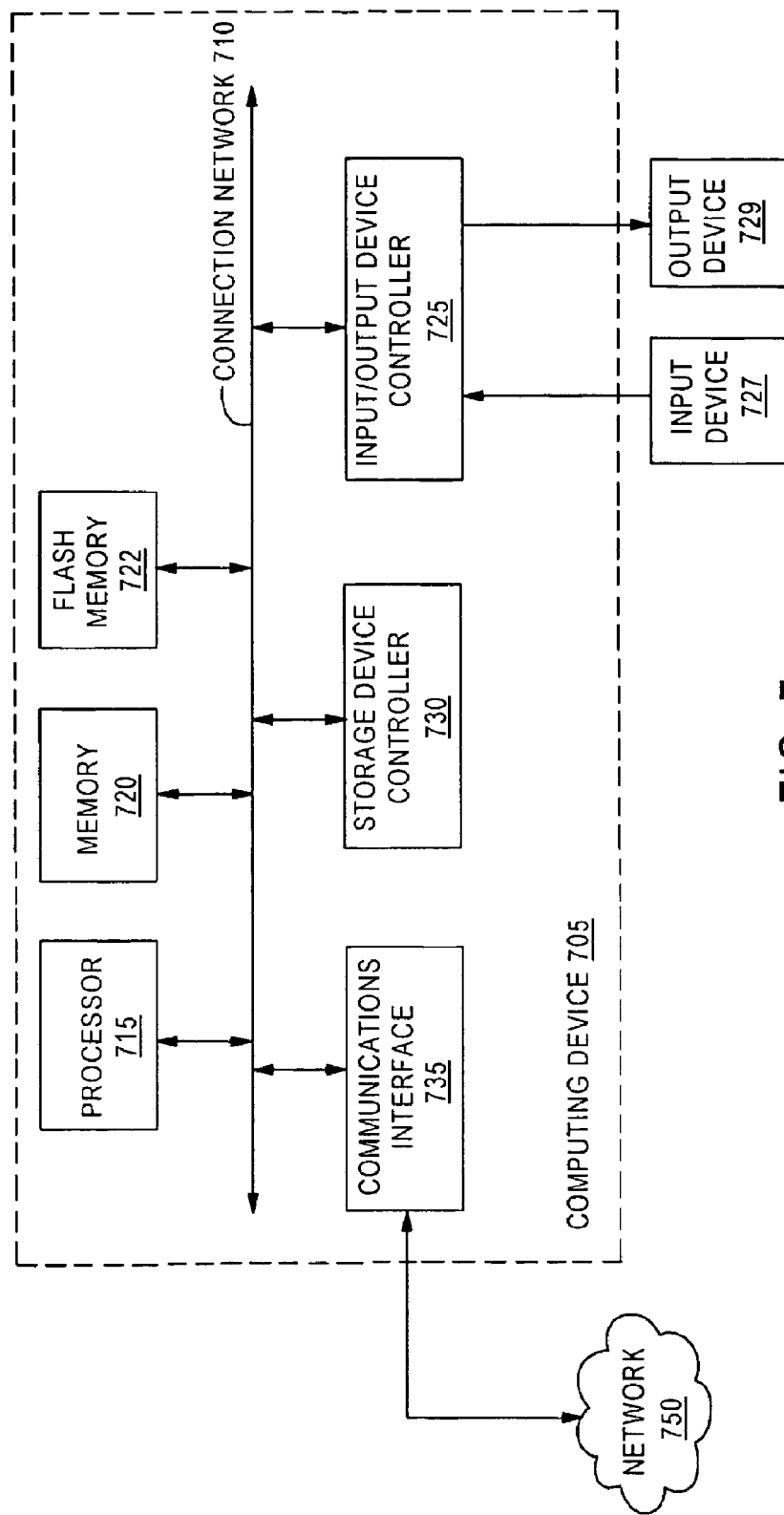
FIG. 7 illustrates a computing device for use in a wheel alignment system.

FIG. 7 illustrates a computing device for use in a wheel alignment system, such as the exemplary wheel alignment setup illustrated in FIG. 4. As illustrated in FIG. 7, the computing device 705 includes a connection network 710, a processor 715, a memory 720, a flash memory 722, an input/output device controller 725, an input device 727, an output device 729, a storage device controller 730, and a communications interface 735.

The connection network 710 operatively couples each of the processor 715, the memory 720, the flash memory 722, the input/output device controller 725, the storage device controller 730, and the communications interface 735. The connection network 710 can be an electrical bus, optical network, switch fabric, or other suitable interconnection system.

The processor 715 is a conventional microprocessor. In one embodiment, the computing device 705 is portable and powered by a battery. In this instance, the processor 715 or other circuitry may be designed for low power operation in order to provide satisfactory runtime before requiring recharging or replacement of the battery.

The processor 715 executes instructions or program code modules from the memory 720 or the flash memory 722. The operation of the computing device 705 is programmable and configured by program code modules. Such instructions may be read into memory 720 or the flash memory 722 from a computer readable medium, such as a device coupled to the storage device controller 730.

Execution of the sequences of instructions contained in the memory 720 or the flash memory 722 cause the processor 715 to perform the method or functions described herein. In alternative embodiments, hardwired circuitry may be used in place of or in combination with software instructions to implement aspects of the disclosure. Thus, embodiments of the disclosure are not limited to any specific combination of hardware circuitry and software. The memory 720 can be, for example, one or more conventional random access memory (RAM) devices. The flash memory 722 can be one or more conventional flash RAM, or electronically erasable programmable read only memory (EEPROM) devices. The memory 720 may also be used for storing temporary variables or other intermediate information during execution of instructions by processor 715. For example, the memory 720 may be used to store wheel angle information received from one or more measurement heads 408, 410.

The input/output device controller 725 provides an interface to the input device 727 and the output device 729. The output device 729 can be, for example, a conventional display screen. The display screen can include associated hardware, software, or other devices that are needed to generate a screen display. In one embodiment, the output device 729 is a conventional liquid crystal display (LCD). The display screen may also include touch screen capabilities. The illustrated embodiment also includes an input device 727 operatively coupled to the input/output device controller 725. The input device 727 can be, for example, an external or integrated keyboard or cursor control pad. Signals from the measurement heads 408, 410 may also be received by the input/output device controller 725. These signals may be converted, if necessary, and interfaced to the communication network 710. As one skilled in the art will appreciate, the processor 715 can use these signals to calculate wheel alignment parameters.

The storage device controller 730 can be used to interface the processor 715 to various memory or storage devices, such as magnetic, optical, or electrical storage. The communications interface 735 provides bidirectional data communication coupling for the computing device 705. The communications interface 635 can be functionally coupled to a network 750. In one embodiment, the communications interface 735 provides one or more input/output ports for receiving electrical, radio frequency, or optical signals and converts signals received on the port(s) to a format suitable for transmission on the connection network 710. The communications interface 735 can include a radio frequency modem and other logic associated with sending and receiving wireless or wireline communications. For example, the communications interface 735 can provide an Ethernet interface, Bluetooth, and/or 802.11 wireless capability for the computing device 705. The communications interface 735 may also be used to receive signals in various formats from the measurement heads 408, 410.

Figure 8:
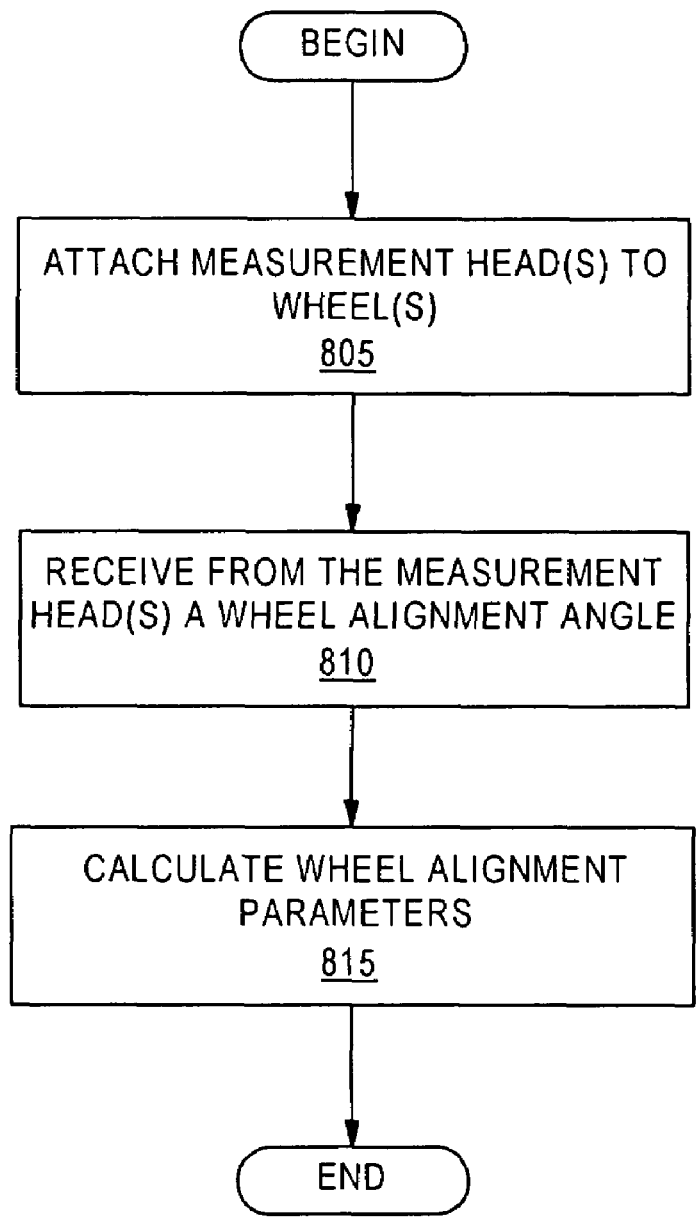
FIG. 8 illustrates an exemplary wheel alignment process.

FIG. 8 illustrates an exemplary wheel alignment process. In the illustrated embodiment, the process begins with attaching 805 one or more measurement heads 408, 410 to corresponding wheels 400, 406. The computing device 705 receives 810 from the measurement heads 408, 410 one or more signals representing wheel alignment angles. The computing device 705 calculates 815 wheel alignment parameters using the received angle information, and the process ends.

Having described embodiments of sensing steering axis inclination and camber with an accelerometer (which are intended to be illustrative and not limiting), it is noted that modifications and variations can be made by persons skilled in the art in light of the above teachings. It is therefore to be understood that changes may be made in the particular embodiments disclosed that are within the scope and spirit of the invention as defined by the appended claims and equivalents.

What is claimed is:

1. A method for measuring a wheel alignment-related angle, the method comprising:
    providing a measurement head including an accelerometer, a thermal sensor and a compensator, the compensator comprising analog circuitry;
    measuring, with the accelerometer, an uncompensated wheel alignment-related angle;

measuring, with the thermal sensor, a temperature to which the accelerometer is subjected; and calculating a compensated wheel alignment-related angle as a function of the uncompensated wheel alignment-related angle and the measured temperature.

2. The method of claim 1, wherein the accelerometer comprises a micro-electromechanical systems (MEMS) device.

3. The method of claim 1, wherein the accelerometer includes a solid proof mass.

4. The method of claim 1, wherein the accelerometer measures internal changes in heat transfer caused by acceleration.

5. The method of claim 1, wherein the wheel alignment-related angle is a wheel angle.

6. The method of claim 1, comprising attaching the measurement head to a wheel.

7. A measurement head for a wheel alignment system, the measurement head comprising:
   an accelerometer configured to measure an uncompensated wheel alignment-related angle with respect to gravity;
   a thermal sensor configured to measure a temperature to which the accelerometer is subjected; and
   a compensator operatively coupled to the accelerometer and the thermal sensor and configured to calculate a compensated wheel alignment-related angle as a function of the uncompensated wheel alignment-related angle and the measured temperature, wherein the compensator comprises analog circuitry.

8. The measurement head of claim 7, further comprising:
   a memory component operatively coupled to the compensator and configured to store at least one of a plurality of angles and corresponding temperatures and an adjustment function.

9. The measurement head of claim 7, wherein the accelerometer comprises a thermal accelerometer and the compensator is further configured to compensate for sensitivity and for zero gravity offset of the thermal accelerometer.

10. The measurement head of claim 7, wherein the compensator implements a feedback control loop to compensate for at least one of thermal sensitivity and zero gravity offset.

11. The measurement head of claim 7, wherein the compensator implements an approximation using at least two temperature points for calculating zero gravity offset.

12. The measurement head of claim 7, wherein the wheel alignment-related angle is a wheel angle.

* * * * *